(12) United States Patent
Piepgrass et al.

(10) Patent No.: US 9,002,936 B2
(45) Date of Patent: Apr. 7, 2015

(54) METANODES FOR OPEN GRAPH PROTOCOLS (75) Inventors: Brian Piepgrass, Mountain View, CA (US); Siddharth Kar, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 629 days.

(21) Appl. No.: 13/316,222

(22) Filed: Dec. 9, 2011

(65) Prior Publication Data

US 2013/0151606 A1    Jun. 13, 2013

(51) Int. Cl.
*G06F 15/16* (2006.01)
*G06Q 30/02* (2012.01)
*G06Q 50/00* (2012.01)

(52) U.S. Cl.
CPC .............. *G06Q 30/02* (2013.01); *G06Q 50/01* (2013.01)

(58) Field of Classification Search
CPC ....................................................... H04L 12/588
USPC .......................................................... 709/204
See application file for complete search history.

(56) References Cited

U.S. PATENT DOCUMENTS

2013/0097180 A1* 4/2013 Tseng ........................... 707/748

* cited by examiner

*Primary Examiner* — Glenford Madamba
(74) *Attorney, Agent, or Firm* — Baker Botts L.L.P.

(57) ABSTRACT

In one embodiment, one or more computing devices identify concept nodes of a same concept in a social graph, and create a meta node connecting to the concept nodes by respective edges.

9 Claims, 8 Drawing Sheets

METANODES FOR OPEN GRAPH PROTOCOLS

TECHNICAL FIELD

This disclosure generally relates to social graphs.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interests. The social networking system may also create and store a record of a user's relationship with other users in the social networking system (e.g., social graph), as well as provide services (e.g., wall-posts, photo-sharing, event organization, messaging, games, or advertisements) to facilitate social interaction between users in the social networking system. The social networking system may transmit contents and messages related to its services to a user's client device over a network.

DESCRIPTION OF EXAMPLE EMBODIMENTS

Figure 1:
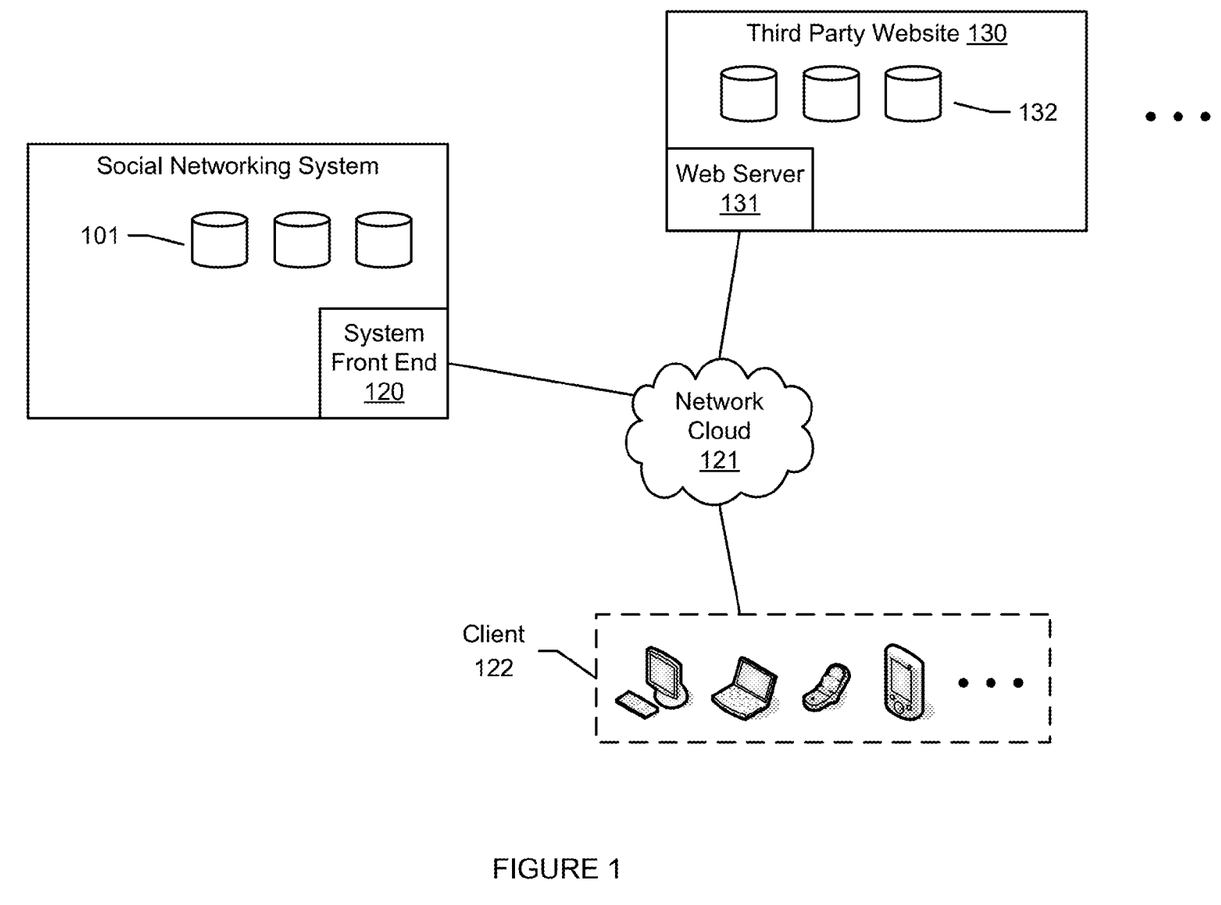
FIG. 1 illustrates an example network environment of an example social networking system.

FIG. 1 illustrates an example network environment of an example social network system. In particular embodiments, a social networking system may comprise one or more data stores 101. For example, the social networking system may store user profile data and social graph information in data stores 101. For example, each data store 101 may comprise one or more storage devices. In particular embodiments, the social networking system may comprise one or more computing devices (e.g., servers) hosting functionality directed to operation of the social networking system. In particular embodiments, one or more of data stores 101 may be operably connected to the social networking system's front end 120. A user of the social networking system may access the social networking system using client device 122. In particular embodiments, front end 120 may interact with client device 122 through network cloud 121. For example, front end 120 may be implemented in software programs hosted by one or more computing devices of the social networking system. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network. Front end 120 may include web or HTTP server functionality, as well as other functionality, to allow users to access the social networking system. Network cloud 121 may represent a network or collection of networks (such as the Internet, a corporate intranet, a virtual private network, a local area network, a wireless local area network, a cellular network, a wide area network, a metropolitan area network, or a combination of two or more such networks) over which client devices 122 may access the social network system.

Users of a social networking system can access other websites or third party websites (e.g., ESPN.com, www.youtube.com). In particular embodiments, a user using client device 122 may connect to and communicate with third party website 130 through network cloud 121. Third party website 130 may comprise web server 131 operatively connected to one or more data stores 132 storing user data and web page information. User data may include, for example, user name, user profile picture, and user profile information (e.g., location, affiliation, interest). Web page information may include, for example, page layout information, scripts, web page content such as text (e.g., ASCII or HTML), media data (e.g., graphics, photos, video clips), and executable code objects (e.g., a game executable within a browser window or frame). In particular embodiments, a user may use a web browser or special-purpose client application hosted on client device 122 to access their party website 130 by sending an HTTP request to web server 131, causing web server 131 to access the one or more data stores 132 and construct one or more web pages or frames displayed in the web browser or the special-purpose client application.

A social networking system may communicate and access third party website 130, and vise versa, through network cloud 121. For example, a web page constructed by third party website 130 for a user of a social networking system can contain information from the social networking system, such as a frame displaying profile pictures of the user's first-degree friends who are currently active on third party website 130. For example, a user's user profile page of a social networking system can contain an embedded video clip that the user posted on third party website 130. In some embodiments, a web page constructed by a first web site may include one or more inline references that cause the client device 122 to access and display content from a second website by incorporating in the web page's HTML document Uniform Resource Locations (URLs) and/or script code (e.g., JavaScript, PHP, AJAX) that causes a client application hosted on the client device 122 to access the second website to dynamically provide content specified by the script code (e.g., profile pictures). In some embodiments, a browser cookie installed by a second website on client device 122 can be used to facilitate accessing the second website. For example, requests transmitted to the social networking system for a particular user may include a browser cookie or other token to enable automatic authentication and access to the social networking system for the particular user (e.g., to access and display profile pictures of the particular user's first-degree friends), without the particular user having to manually enter user ID and password information of the social networking system.

A social networking system may store records of users and relationships between users in one or more social graphs.

Figure 2:
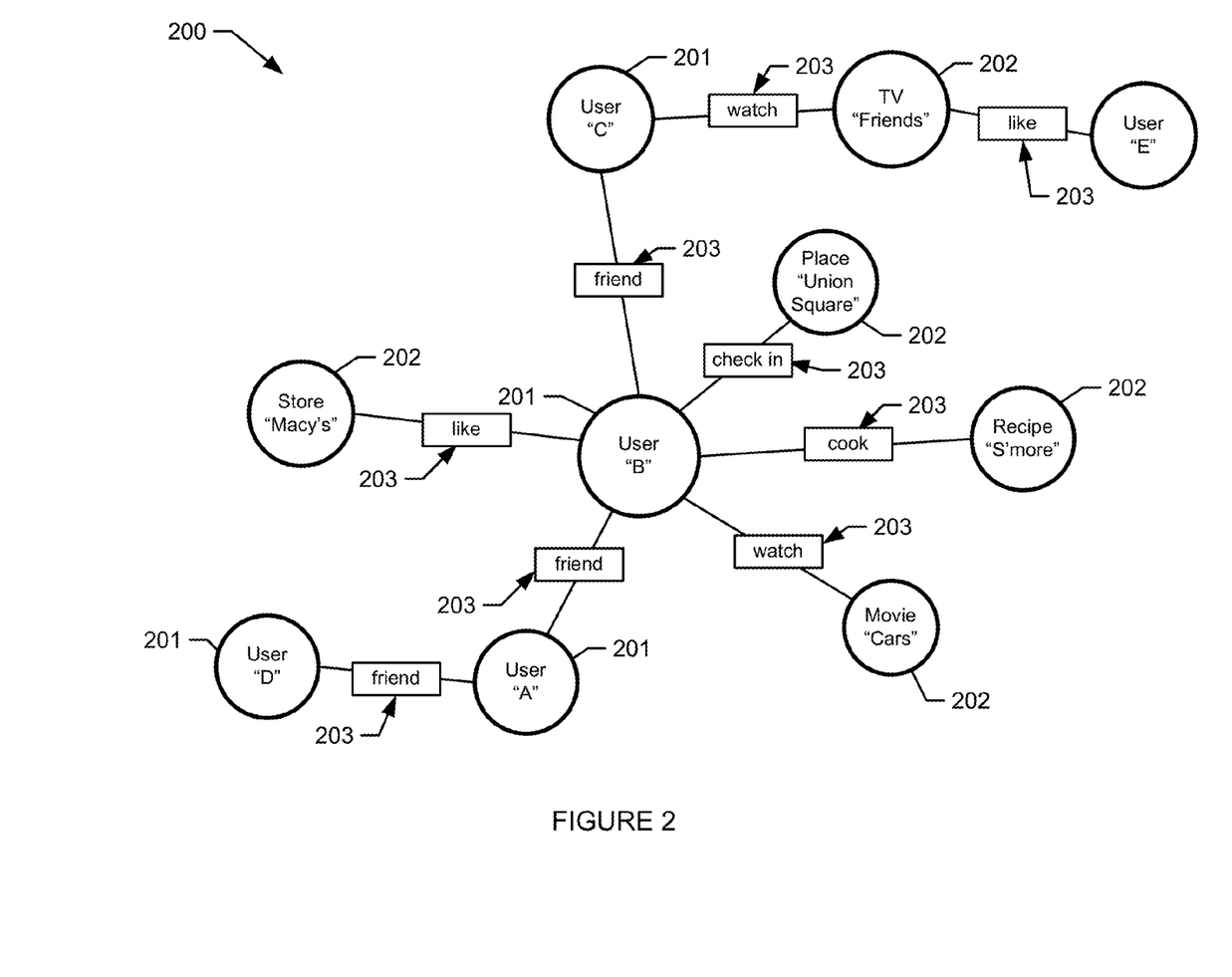
FIG. 2 illustrates an example social graph.

FIG. 2 illustrates an example social graph 200. In particular embodiments, the social networking system may store social graph 200 in data stores 101. In particular embodiments, social graph 200 may comprise a plurality of user nodes 201, a plurality of concept nodes 202, and a plurality of edges 203 between nodes.

In particular embodiments, each user node 201 may correspond to a user of the social networking system. When a user registers for an account with the social networking system, the social networking system may create a user node corresponding to the user, and store the user node in one or more of data stores 101. The user node may comprise information provided by the user and information gathered by various systems, including the social networking system. For example, the user may provide his name, profile picture, contact information, birth date, gender, marital status, family status, employment, education background, preferences, interests, and other demographical information to be included in the user node. In particular embodiments, each user node 201 may comprise one or more data objects corresponding to information associated with a user. In particular embodiments, each user node 201 may correspond to a web page or a user profile page. For example, in response to a request including a user identifier of a particular user, system front end 120 can access a corresponding user node (stored in one or more of data stores 101) based on the user identifier, and construct a user profile page comprising a name, a profile picture, and interests of the particular user.

In particular embodiments, each concept node 202 may correspond to a concept of the social networking system. For example, a concept can correspond to a real-world entity, such as a movie, a song, a sports team, a celebrity, a restaurant, or a place. An administrative user of a concept may create a concept by providing information of the concept (e.g., by filling out an online form), causing the social networking system to create a corresponding concept node, and store the concept node in one or more of data stores 101. A concept node 202 may comprise information of a concept provided by an administrative user of the concept and information gathered by various systems, including the social networking system. For example and without limitation, information of a concept can include as a name or a title, one or more images (e.g., an image of cover page of a book), a location (e.g., an address, a geographical location), a web site (e.g., an URL address) or contact information (e.g., a phone number, an email address). In particular embodiments, each concept node 202 may comprise one or more data objects corresponding to information associated with the concept node. In particular embodiments, each concept node 202 may correspond to a web page. For example, in response to a request including a name (or an URL address), system front end 120 can access a corresponding concept node (stored in one or more of data stores 101) based on the name, and construct a web page comprising the name, one or more images, and contact information of the concept.

In particular embodiments, an edge 203 of a pair of nodes may represent a relationship between the pair of nodes. In particular embodiments, each edge 203 may comprise one or more data objects corresponding to the relationship between a pair of nodes. For example, a first user can declare a second user that the first user considers to be his friend, causing the social networking system to transmit a friend request to the second user. In response to the second user's confirmation of the friend request, the social networking system may create an edge between the first user and the second user in social graph 200, and store the edge in one or more of data stores 101. In the example of FIG. 2, social graph 200 includes an edge indicating a friend relation between user nodes of user "A" and user "B", and an edge indicating a friend relation between user nodes of user "C" and user "B."

In particular embodiments, the social networking system may create an edge between a user node and a concept node in social graph 200. For example, the social networking system may construct a web page corresponding to the concept node for a store "Macy's" illustrated in FIG. 2, and include a selectable icon "like" in the web page. A user viewing the web page (by using a web browser or a special-purpose application hosted by the user's client device 122) can indicate liking of the web page (thus the concept of the concept node) by selecting the selectable icon "like" in the web page, causing client device 122 to transmit to the social networking system a message indicating the user's liking of the store. In response to the message, the social networking system can create an edge between the user and the concept node, as illustrated by the "like" edge between the user node of user "B" and the concept node of store "Macy's" in FIG. 2. In particular embodiments, the social networking system may store the edge in one or more of data stores 101.

Social graph 200 may comprise other types of edges between a user node and a concept node. In particular embodiments, an edge between a user node and a concept node may represent a particular action or activity performed by a user of the user node toward a concept of the concept node. For example, in addition to a user (user "B) liking a store ("Macy's), a user (user "B") can watch a movie ("Cars"), cook a recipe ("S'more"), or check in to a place ("Union Square"), as illustrated in FIG. 2. For example, the social networking system (or a third-party web site) may construct a web page corresponding to the concept node for a recipe "S'more" illustrated in FIG. 2. A user viewing the web page (by using a web browser or a special-purpose application hosted by the user's client device 122) can select a selectable icon "cook" incorporated in the web page to indicate that he is cooking S'more by using this particular recipe, causing client device 122 to transmit to the social networking system a message indicating the user's action (i.e., cooking with the recipe "S'more"). In response to the message, the social networking system may create an edge (a "cook" edge) between a user node of the user and the concept node of the recipe "S'more," and store the edge in one or more of data stores 101. Similarly, the social networking system may create a "watch" edge or a "check in" edge (as illustrated in FIG. 2) in response to a user's action corresponding to a respective action.

In particular embodiments, social graph 200 may be used to determine what information is relevant to a particular user. For example, users or concepts represented by other nodes near a user node representing to the particular user may be considered relevant to the user. Furthermore, in particular embodiments, the closer a second node is to the user node representing the particular user, the more relevant the user or concept of the second node is to the particular user. That is, the less hops between a second node and the user node representing the particular user, the more relevant the user or concept of the second node is to the particular user. For example, Movie "Cars" and User "A" are closer to User "B" than TV "Friends" and User "D" are to User "B", as illustrated in FIG. 2.

In particular embodiments, a third-party web page hosted by third party website 130 may include a selectable icon (e.g., implemented in JavaScript, AJAX, or PHP codes) representing an action or activity. For example, a web page "Old Pro" about The Old Pro Sports Bar in Palo Alto, Calif., may include a selectable icon such as "like", "check in", "eat", or "recommend." A user viewing the third-party web page (by using a web browser or a special-purpose application hosted by the user's client device 122) can perform an action by selecting the selectable icon (e.g., "eat"), causing client device 122 to transmit to the social networking system a message indicating the user's action (e.g., eating at "Old Pro"). If a concept node corresponding to the third-party web page exists in social graph 200, in response to the message, the social networking system may create an edge (e.g., an "eat" edge) between a user node corresponding to the user and the concept node corresponding to the third-party web page, and store the edge in one or more of data store 101. If a concept node corresponding to the third-party web page does not exist in social graph 200, in response to the message, the social networking system may create a concept node corresponding to the third-party web page, create an edge (e.g., an "eat" edge) between the newly-created concept node and a user node corresponding to the user, and store the concept node and the edge in one or more of data stores 101.

A concept node corresponding to a third-party web page may comprise information extracted from the third-party web page (e.g., a name or title, one or more images, a location, a web site, etc.). For example, the social networking system may use a data extracting software to analyze content of the third-party web page (e.g., a structured document such as an HTML document) and extract information from the third-party web page. In particular embodiments, web server 131 may construct a third-party web page including meta data recognizable by the social networking system. For example, web server 131 may construct a third-party web page including meta data based on Open Graph Protocol provided by Facebook. Meta data based on Open Graph Protocol may comprise a set of attributes coded as HTML meta tags. Each attribute may correspond to a property with an associated value, as illustrated in the following example:

```
<meta property="og:title" content="The Old Pro" />
<meta property="og:url" content="https://example.com/the-old-pro" />
<meta property="og:image" content="https://example.com/image/the-old-pro.jpg" />
<meta property="og:type" content="bar" />
<meta property="og:latitude" content="37.44487" />
<meta property="og:longitude" content="-122.161325" />
<meta property="og:phone_number" content="6503261446" />
<meta content="foursquare" property="og:site_name" />
```

For example, an attribute can correspond to a title of the third-party web page with a value of "The Old Pro." For example, an attribute can correspond to an URL of the third-party web page with a value of "https://example.com/the-old-pro." For example, an attribute can correspond to a type of entity the third-party web page represents and with a value of "bar." For example, a pair attributes can correspond to a geographical location of the entity the third-party web site represents and with values of geographical coordinates—e.g., (37.44487, −122.161325). For example, an attribute can correspond to a phone number of the entity the third-party web page represents and with a value "6503261446." For example, an attribute can correspond to a web site name of the third-party web page with a value "foursquare." A server side process hosted by one or more computing devices of the social networking system may parse a third-party web page including meta data based on Open Graph Protocol described above, extract information based on the meta data, and construct a concept node comprising the extracted information (e.g., a title, an URL, an image, a type of entity, a geographic location, a phone number as illustrated in the above example).

A social graph can comprise several (more than one) concept nodes corresponding to a same concept (e.g., a same real-world entity). That is, each concept node of the several concept nodes may correspond to a different web page that is about the same concept. For example, a popular restaurant may have several web pages authored by various review sites and bloggers. For example, a popular music band or tourist destination may have many fan pages hosted by various web sites. Particular embodiments describe methods of determining a number of concept nodes corresponding to a same concept. Furthermore, particular embodiments describe methods of ranking concept nodes corresponding to a same concept based on traffic data and social factors.

Figure 3:
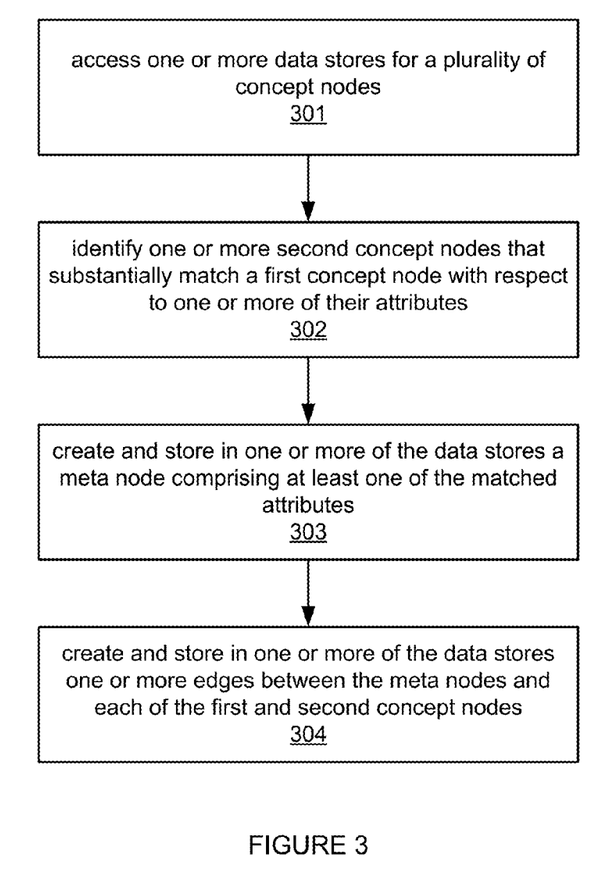
FIG. 3 illustrates an example method of creating a meta node.

FIG. 3 illustrates an example method of creating a meta node. The example method of FIG. 3 can be implemented by a server-side process hosted by one or more computing devices of the social networking system. In particular embodiments, the server-side process may access one or more of data stores 101 for a plurality of concept nodes (301). As described earlier, a concept node may correspond to a web page hosted by the social networking system. A concept node may correspond to a third-party web page hosted by a third-party web site 130. Each concept node may comprise a set of attributes, such as a title, an URL, one or more images, a type of concept, a geographic location, or a phone number. Other examples of attributes can be an author and an ISBN number for a concept node corresponding to a book; actors, directors and a release date for a concept node corresponding to a movie, and so on.

In particular embodiments, for at least a first concept node, the server-side process may identify one or more second concept nodes that substantially match the first concept node with respect to one or more of their attributes (302). For example, for a first concept node corresponding to "Old Pro" (e.g., The Old Pro Sports Bar in Palo Alto, Calif. as described earlier). the server-side process can identify one or more second concept nodes that substantially match the first concept node with respect to title (e.g., "Old Pro"), geographic location (e.g., "37.44487, −122.161325") and phone number (e.g., "6503261446"). For example, the server-side process can match a second concept node with a title "Old Pro" and a phone number "6503261446" to the first concept node. For example, the server-side process can match a second concept node with a title "old_pro_restaurant" and a phone number "6503261446" to the first concept node. For example, the server-side process can match a second concept node with a title "Old Pro" and an address "541 Ramona Street, Palo Alto, Calif. 94301" to the first concept node if the server-side process determines that the address "541 Ramona Street, Palo Alto, Calif. 94301" substantially matches the geographic location "37.44487, −122.161325" (e.g., by using a mapping application).

In particular embodiments, the server-side process may create a meta node comprising at least one of the matched attributes (303). Using the "Old Pro" example above, the server-side process can create a meta node comprising attributes in title ("Old Pro"), phone number ("6503261446"), and address ("541 Ramona Street, Palo Alto, Calif. 94301"). In particular embodiments, the server-side process may store the meta node in one or more of data stores 101. In particular embodiments, the meta mode may comprise one or more data objects corresponding to information (e.g., attributes) associated with the meta node. In one embodiment, the meta node is not visible to users of the social networking system. For example, the meta node may not have a corresponding web page (that is visible to users of the social networking system).

Figure 4:
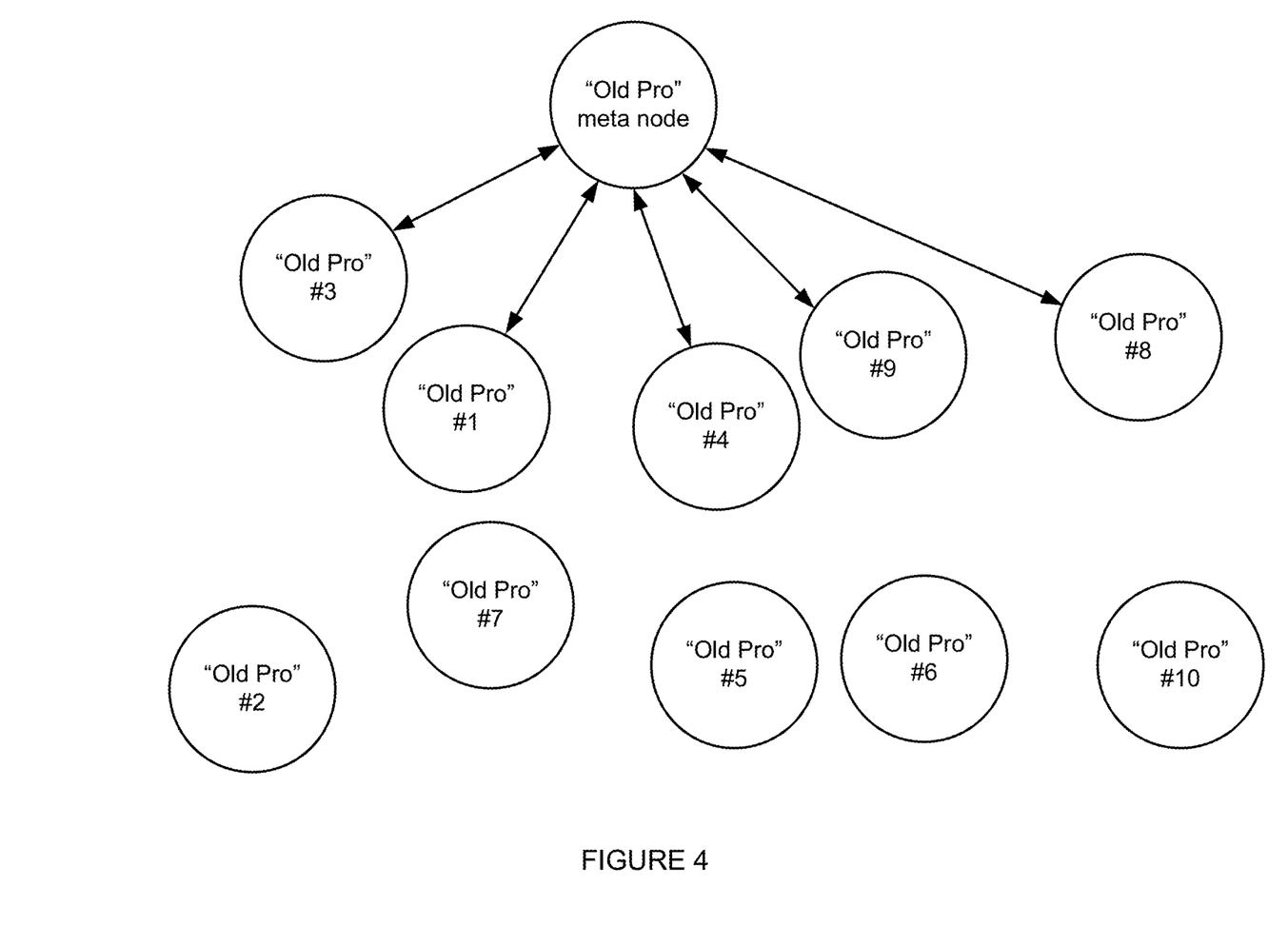
FIG. 4 illustrates an example graph including a meta node and a plurality of concept nodes.

In particular embodiments, the server-side process may create and store in one or more of data stores 101 one or more edges between the meta node and each of the first and second concept nodes (304). FIG. 4 illustrates an example graph including a meta node and a plurality of concept nodes. In the example of FIG. 4, the server-side process may for a first concept node (e.g., "Old Pro" #3), identify second concept nodes that substantially match the first concept node with respect to one or more of their attributes (e.g., "Old Pro" #1, "Old Pro" #4, "Old Pro" #9, "Old Pro" #8). The server-side process can create a meta node "Old Pro," and create edges between the meta node and each of the first and the second concept nodes. Meanwhile, the example graph of FIG. 4 may include third concept nodes (e.g., "Old Pro" #2, "Old Pro" #7, "Old Pro" #5, "Old Pro" #6, "Old Pro" #10), while the server-side process determines that those third concept nodes do not match the first concept node ("Old Pro" #3). For example, those third concept nodes may correspond to web pages representing concepts different from the concept corresponding to the first concept node ("Old Pro" #3). For example, the first and second concept nodes (connected to the meta node) may correspond to web pages representing The Old Pro Sports Bar described earlier, while the third concept nodes may correspond to web pages representing different concepts (e.g., different concepts but with similar names such as "Old Pro Contractor", "Old Pro Golf", "Old Pro Auto Shop", etc.). Meanwhile, those third concept nodes do not have edges connecting to the meta node in the example graph of FIG. 4.

Figure 5:
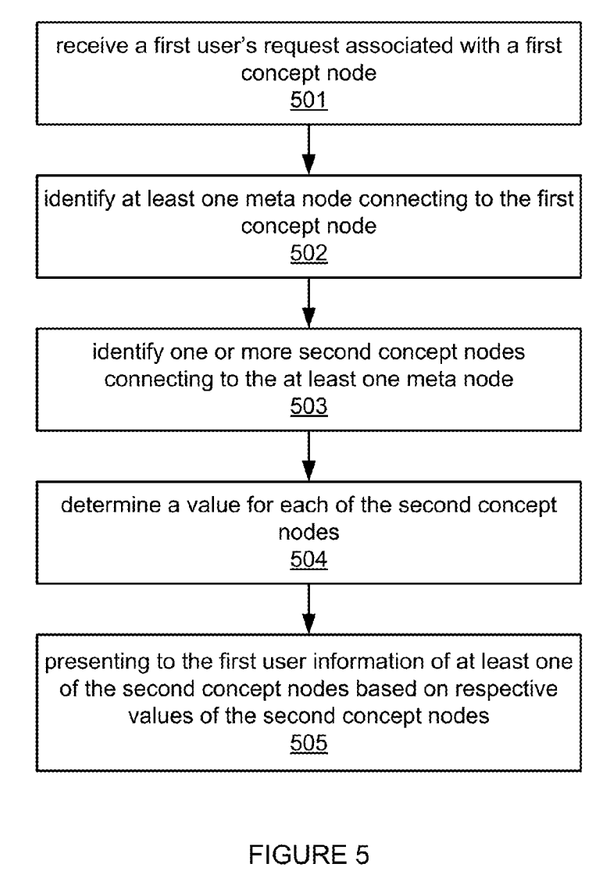
FIG. 5 illustrates an example method of ranking concept nodes connected to a same meta node.

By creating a meta node connecting concept nodes corresponding to a same concept (or entity), the social networking system can, given a particular concept node, easily look up other concept nodes having a same concept of the particular concept node. Further more, the social networking system can rank the other concept nodes having the same concept based on traffic data and social factors. FIG. 5 illustrates an example method of ranking concept nodes connected to a same meta node. The example method of FIG. 5 can be implemented by a server-side process hosted by one or more computing devices of the social networking system. In particular embodiments, the server-side process may receive a first user's request associated with a first concept node (501). For example, the first user can request to access a web page corresponding to the first concept node using a web browser or a special-purpose application hosted by the first user's client device 122. In response to the request transmitted from the first user's client device 122, system front end 120 can construct and transmit to the first use's client device 122 the web page, while transmitting to the server-side process a message indicating the first user's request associated with the first concept node. Similarly, in response to the request transmitted from the first user's client device 122, web server 131 can construct and transmit to the first user's client device 122 the web page—i.e., a third-party web page corresponding to the first concept node. The third-party web page can include codes (e.g., in JavaScript, AJAX, or PHP) for at least one selectable icon representing an action associated with the first concept node as described earlier. While rendering the third-party web page, the web browser (or special-purpose application) can cause the first user's client device 122 to transmit to system front end 120 a request to retrieve content for the at least one selectable icon. In response to the request, the system front end 120 can transmit content for the at least one selectable icon to the first user's client device 122, while transmitting to the server-side process a message indicating the first user's request associated with the first concept node.

In particular embodiments, the server-side process may identify at least one meta node connecting to the first concept node (502). In particular embodiments, the server-side process may identify one or more second concept nodes connecting to the at least one meta node (503). Using FIG. 4 as an example, the server-side process may receive the first user's request associated with the first concept node "Old Pro" #9. The server-side process can identify a meta node "Old Pro" connected to the first concept node by an edge, and identify second concept nodes "Old Pro" #3, "Old Pro" #1, "Old Pro" #4, "Old Pro" #8, each of second concept nodes being connected to the "Old Pro" meta node by a respective edge.

In particular embodiments, the server-side process may determine a value for each of the second concept nodes (504). In particular embodiments, the server-side process may determine a value for each of the second concept nodes based on traffic data of each concept node's corresponding web page. For example, the social networking system may detect a visit to a concept node's corresponding web page when system front end 120 receives a request to serve the corresponding web page. For example, the social networking system may detect a visit to a concept node's corresponding web page when system front end 120 receives a request to serve content of a selectable icon incorporated in the concept node's corresponding web page. The social networking system may accumulate and store in one or more of data stores 101 a number of visits to a web page corresponding to a concept node. The server-side process may access one or more of data stores 101 for a number of visits for each of the second concept nodes, and assign a score to each of the second concept nodes based on the numbers of visits. For example, the server-side process can assign a score of 1.0 to a second concept node if the second concept node's corresponding web page has been visited for over 10,000 times, a score of 0.8 if the corresponding web page has been visited for over 5,000 times, a score of 0.6 if the corresponding web page has been visited for over 1,000 times, or a score of 0.4 if the corresponding web page has been visited for 1,000 times or less. The server-side process may assign a score to each of the second concept nodes further based on time. For example, the server-side process can assign a score of 1.0 to a second concept node if the second concept node's corresponding web page has been visited for over 1,000 times in the past two week, a score of 0.8 if the corresponding web page has been visited for over 500 times in the past two weeks, or a score of 0.6 if the corresponding web page has been visited for 500 times or less in the past two weeks, etc. As yet for another example, the server-side process may assign a score to second concept nodes further based on a type or category of a common concept represented by the second concept nodes. For example, the server-side process can assign a score of 1.0 to a second concept node for a celebrity (e.g., Jon Bon Jovi) if the corresponding web page has been visited for over 100,000 times, while assign a score 1.0 to a second concept node for a café if the corresponding web page has been visited for over 500 times.

In particular embodiments, the server-side process may determine a value for each of the second concept nodes based on one or more edges between each of the second concept nodes and one or more user nodes. That is, the server-side process may determine a value for a second concept node based on a level of engagement by users, as measured by a number of edges (i.e., actions) between the concept node and user nodes. For example, the server-side process may assign a score of 1.0 to a second concept node if the second concept node has more than 100 edges connecting to user nodes, a score of 0.7 if the second concept node has more than 50 edges connecting to user nodes, or a score of 0.5 if the second concept node has 50 edges or less connecting to user nodes.

The server-side process may determine a level of engagement with a second concept node by users based on a type of edges. For example, for a meta node and connected second concept nodes relating to recipes of "S'more", the server-side process can give more weighting to edges of "cook" than edges of "like." For example, while counting a number of edges between a second concept node and user nodes, the server-side process can count a "cook" edge as 1.5 edges, while counting a "like" edge as one edge.

The server-side process may determine a value for each of the second concept nodes based on social relevancy to the first user. For example, the server-side process may determine a value for a second concept node based on a number of edges between the second concept node and one or more first user's social contact—i.e., one or more user nodes that are within a pre-determined hops from the user node of the first user. For example, the server-side process may assign a score of 1.0 to a second concept node if the second concept node has more than 30 edges connecting to user nodes that are within one hop from the user node of the first user (i.e., the first user's first-degree friends), a score of 0.7 if the second concept node has more than 30 edges connecting to user nodes that are within two hops from the user node of the first user, etc.

Figure 6A:
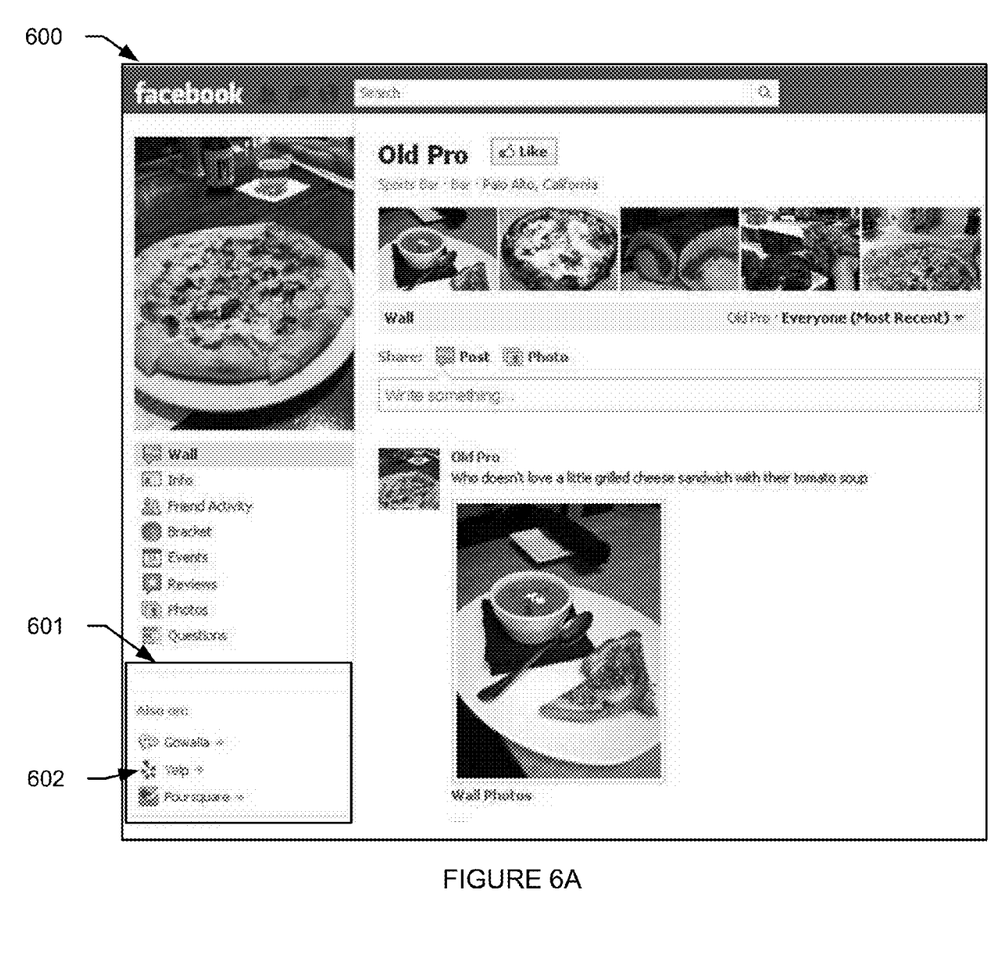
FIG. 6A illustrates an example web page with a list of other web pages related to the example web page.
Figure 6B:
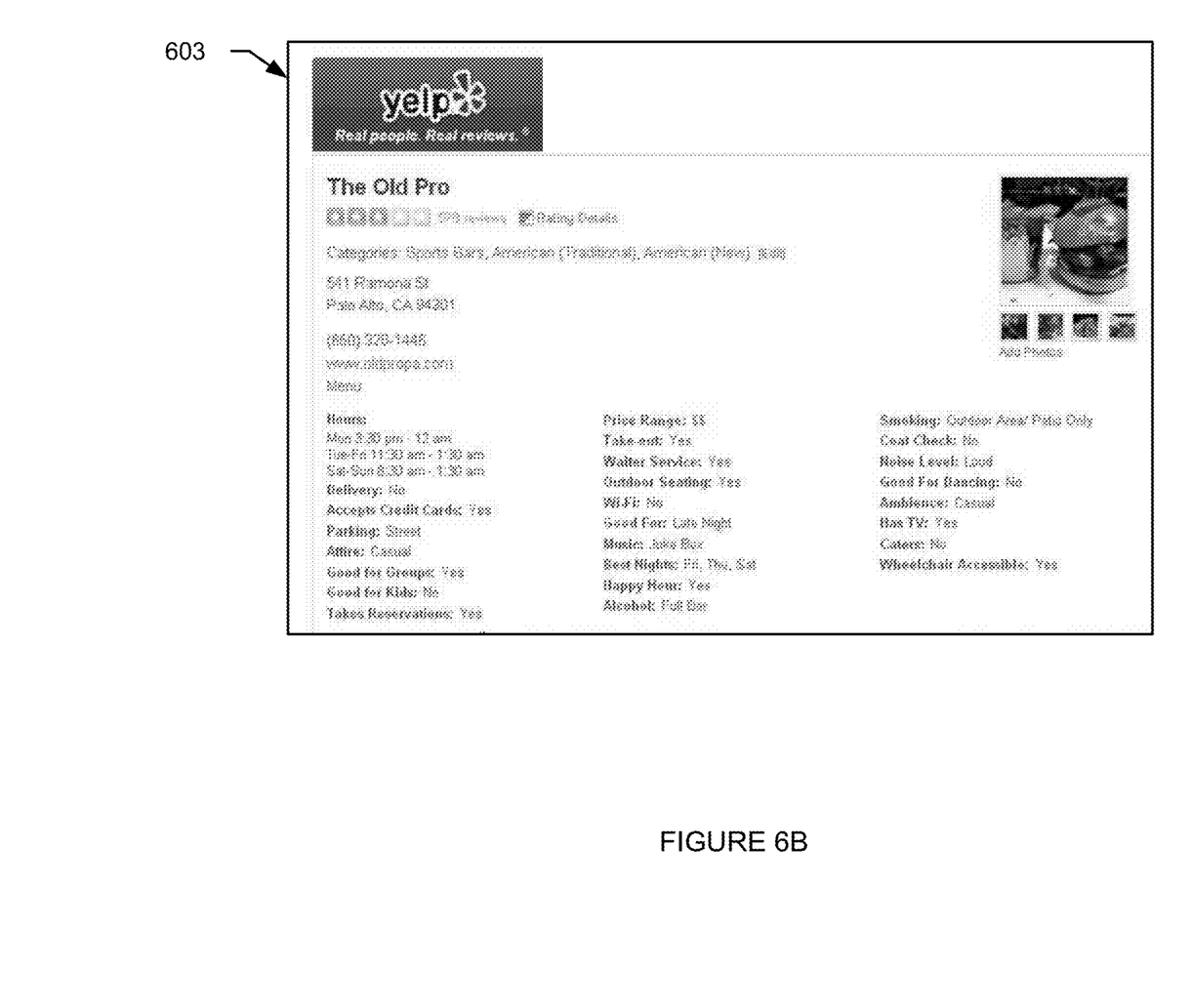
FIG. 6B illustrates an example web page having a same concept as the example web page of FIG. 6A.

In particular embodiments, the server-side process may present to the first user information of at least one of the second concept nodes based on respective values of the second concept nodes (505). For example, the server-side process may present to the first user information of second concept nodes with a respective score greater than a pre-determined value (e.g., 0.5). For example, the server-side process may rank the second concept nodes based on respective scores, and present to the first user information of top-ranked second concept nodes (e.g., top 3). Information of particular second concept nodes presented to the first user may comprise one or more images and web site names of the particular second concept nodes. Information of particular second concept nodes presented to the first user may also comprise user profile pictures of the first user's social contacts whose corresponding user node having one or more edges (e.g., "like", "cook", "check in", etc.) connected to one or more of the particular second concept nodes. Information of the particular second concept nodes presented to the first user may be included in the web page corresponding to the first concept node. FIG. 6A illustrates an example web page with a list of other web pages related to the example web page. In the example of FIG. 6A, web page 600 corresponds to a first concept node, representing The Old Pro Sports Bar as described earlier. A frame 601 (e.g., an iframe) comprises names of three web sites (e.g., Gowalla, Yelp, Foursquare), each name linking to a web page (hosted by the respective web site) corresponding to a second concept node selected by the example method of FIG. 5. That is, each web page represents a same concept as web page 600 (The Old Pro Sports Bar). For example, a link 602 in web page 600 (e.g., "Yelp" illustrated in FIG. 6A) corresponds to a web page 603 (illustrated in FIG. 6B) representing the same concept as web page 600 (The Old Pro Sports Bar) hosted by a different web site (e.g., "Yelp").

Figure 7:
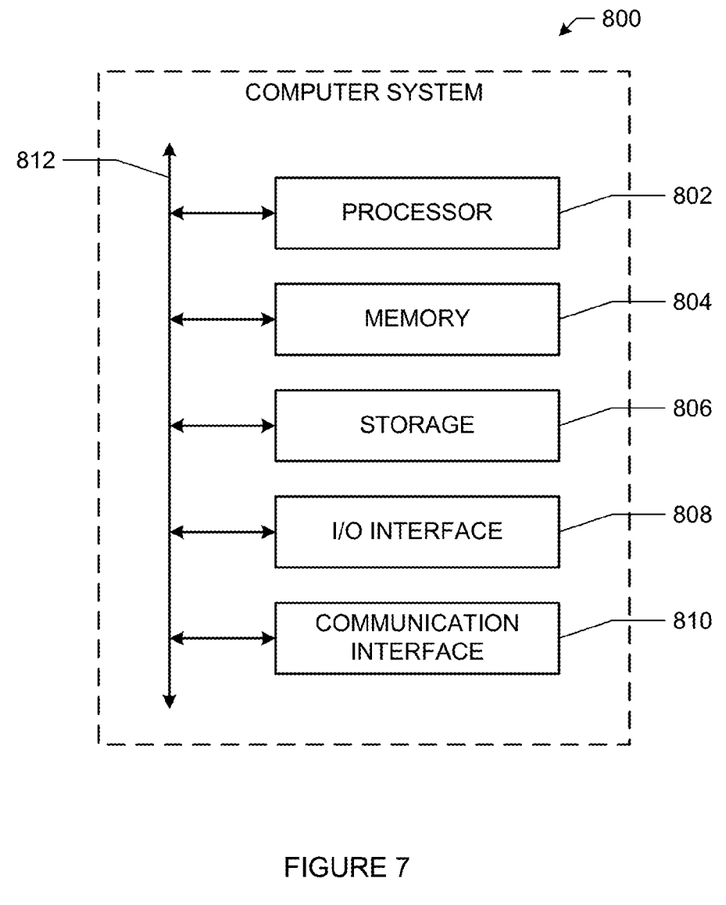
FIG. 7 illustrates an example computer system.

FIG. 7 illustrates an example computer system 800, which may be used with some embodiments of the present invention. This disclosure contemplates any suitable number of computer systems 800. This disclosure contemplates computer system 800 taking any suitable physical form. As example and not by way of limitation, computer system 800 may be an embedded computer system, a system-on-chip (SOC), a desktop computer system, a mobile computer system, a game console, a mainframe, a mesh of computer systems, a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. In particular embodiments, memory 804 includes main memory for storing instructions for processor 802 to execute or data for processor 802 to operate on. As an example and not by way of limitation, computer system 800 may load instructions from storage 806 to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM).

In particular embodiments, storage 806 includes mass storage for data or instructions. As an example and not by way of limitation, storage 806 may include an HDD, a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), or flash memory or a combination of two or more of these.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, microphone, display, touch screen, mouse, speaker, camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) for communicating with an Ethernet or other wire-based network or a wireless NIC (WNIC) for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (e.g., a BLUETOOTH WPAN), a WI-FI network (e.g., a 802.11a/b/g/n WI-FI network), a WI-MAX network, a cellular network (e.g., a Global System for Mobile Communications (GSM) network, a Long Term Evolution (LTE) network), or other suitable wireless network or a combination of two or more of these.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an INFINIBAND interconnect, a low-pin-count (LPC) bus, a memory bus, a Peripheral Component Interconnect Express or PCI-Express bus, a serial advanced technology attachment (SATA) bus, a Inter-Integrated Circuit (I2C) bus, a Secure Digital (SD) memory interface, a Secure Digital Input Output (SDIO) interface, a Universal Serial Bus (USB) bus, a General Purpose Input/Output (GPIO) bus, or another suitable bus or a combination of two or more of these. Bus 812 may include one or more buses 812, where appropriate.

Herein, reference to a computer-readable non-transitory storage medium may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable computer-readable non-transitory storage medium, or a suitable combination of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:

by one or more computing devices, accessing one or more data stores for a plurality of structured documents, wherein each structured document of the plurality of structured documents comprises meta data based on the Open Graph Protocol, the meta data representing each of the one or more attributes as a property and an associated value for the property;

by one or more computing devices, extracting one or more attributes from each structured document of the plurality of structured documents, wherein the extracting the one or more attributes from each structured document of the plurality of structured documents comprises, for each attribute of the one or more attributes, extracting the property and the associated value for the property from the meta data for the respective structured document;

by one or more computing devices, for each structured document of the plurality of structured documents, creating and storing a concept node for the structured document, the concept node comprising the one or more attributes extracted from the structured document, such that a plurality of concept nodes are constructed and stored;

by one or more computing devices, accessing the plurality of concept nodes;

by one or more of the computing devices, for at least a first one of the plurality of concept nodes:

identifying one or more second concept nodes comprising at least one attribute that substantially matches at least one attribute of the first concept node, the at least one attribute of the one or more second concept nodes and the at least one attribute of the first concept node being matched attributes;

creating and storing a meta node comprising at least one of the matched attributes; and creating and storing one or more edges between the meta node and each of the first concept node and the one or more second concept node.

2. The method of claim 1, wherein one or more of the plurality of concept nodes corresponds to a web page.

3. One or more computer-readable non-transitory storage media embodying software that is operable when executed to:
access one or more data stores for a plurality of structured documents, wherein each structured document of the plurality of structured documents comprises meta data based on the Open Graph Protocol, the meta data representing each of the one or more attributes as a property and an associated value for the property;
extract one or more attributes from each structured document of the plurality of structured documents, wherein extracting the one or more attributes from each structured document of the plurality of structured documents comprises, for each attribute of the one or more attributes, extracting the property and the associated value for the property from the meta data for the respective structured document;
or each structured document of the plurality of structured documents, create and store a concept node for the structured document, the concept node comprising the one or more attributes extracted from the structured document, such that a plurality of concept nodes are constructed and stored;
access the plurality of concept nodes;
for at least a first one of the plurality of concept nodes:
identify one or more second concept nodes comprising at least one attribute that substantially matches at least one attribute of the first concept node, the at least one attribute of the one or more second concept nodes and the at least one attribute of the first concept node being matched attributes;
create and store a meta node comprising at least one of the matched attributes; and
create and store one or more edges between the meta node and each of the first concept node and the one or more second concept nodes.

4. The media of claim 3, wherein one or more of the plurality of concept nodes corresponds to a web page.

5. The method of claim 1, wherein the one or more edges between the meta node and each of the first and second concept nodes are the only edges associated with the meta node.

6. The media of claim 3, wherein the one or more edges between the meta node and each of the first and second concept nodes are the only edges associated with the meta node.

7. A system comprising:
one or more computing devices configured to perform processes comprising:
accessing one or more data stores for a plurality of structured documents, wherein each structured document of the plurality of structured documents comprises meta data based on the Open Graph Protocol, the meta data representing each of the one or more attributes as a property and an associated value for the property;
extracting one or more attributes from each structured document of the plurality of structured documents, wherein the extracting the one or more attributes from each structured document of the plurality of structured documents comprises, for each attribute of the one or more attributes, extracting the property and the associated value for the property from the meta data for the respective structured document;
for each structured document of the plurality of structured documents, creating and storing a concept node for the structured document, the concept node comprising the one or more attributes extracted from the structured document, such that a plurality of concept nodes are constructed and stored;
accessing the plurality of concept nodes;
for at least a first one of the plurality of concept nodes:
identifying one or more second concept nodes comprising at least one attribute that substantially matches at least one attribute of the first concept node, the at least one attribute of the one or more second concept nodes and the at least one attribute of the first concept node being matched attributes;
creating and storing a meta node comprising at least one of the matched attributes; and
creating and storing one or more edges between the meta node and each of the first concept node and the one or more second concept nodes.

8. The system of claim 7, wherein one or more of the plurality of concept nodes corresponds to a web page.

9. The system of claim 7, wherein the one or more edges between the meta node and each of the first and second concept nodes are the only edges associated with the meta node.

* * * * *